June 21, 1960
R. C. MULLER ET AL
2,941,426
CHUCK KEY HOLDER
Filed Oct. 10, 1957
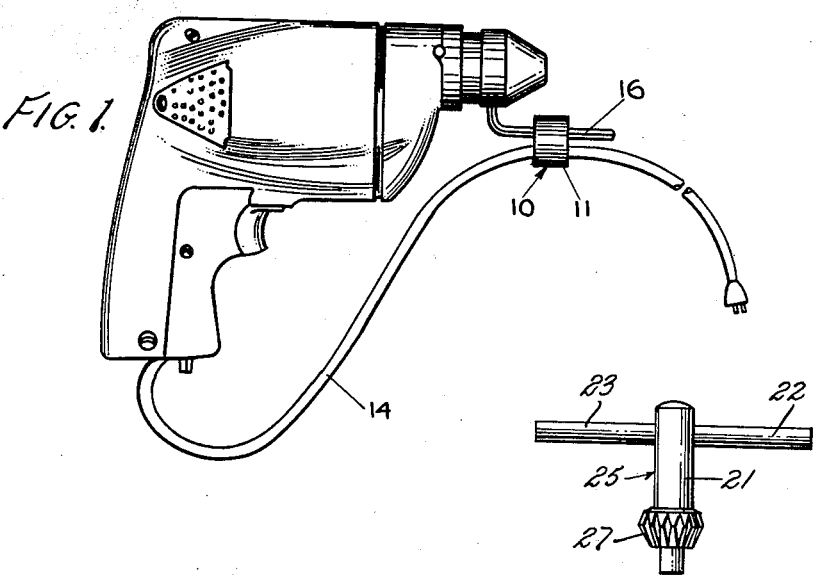
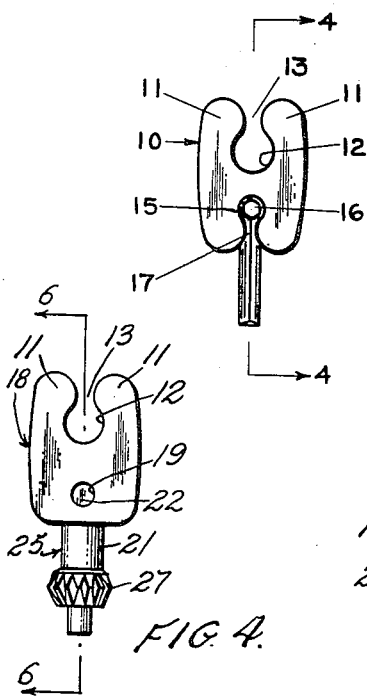
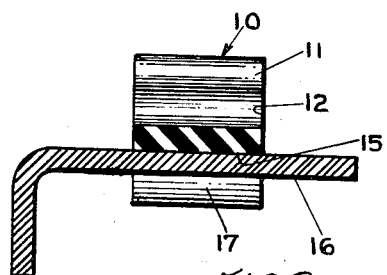
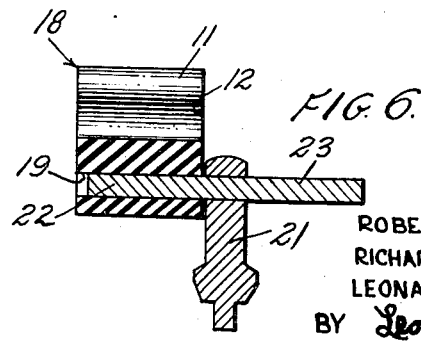
INVENTORS.
ROBERT C. MULLER
RICHARD G. BRADYHOUSE
LEONARD J. KERPELMAN
BY Leonard J. Kerpelman
ATTY.

United States Patent Office 2,941,426
Patented June 21, 1960

2,941,426
CHUCK KEY HOLDER

Robert C. Muller, Hampstead, Richard G. Bradyhouse, Catonsville, and Leonard J. Kerpelman, Baltimore, Md.; said Muller and Bradyhouse assignors to The Black and Decker Manufacturing Company, Towson, Md., a corporation of Maryland Filed Oct. 10, 1957, Ser. No. 689,289

2 Claims. (Cl. 77—6)

The present invention relates to chuck key holders, and is particularly concerned with devices for holding the key which is used for tightening geared type or hexagonal key type chucks so as to firmly fasten the drill or other tool being used in the chuck.

Such keys are an essential tool in the use and operation of most portable electric tools, and are at the same time a source of great annoyance to the users of such tools for the reason that the keys are small and easily misplaced or lost.

Such chuck key holders are well known in the portable electric tool art, one well known type taking the form of a rubber leash which is looped around the electric cord cable of the tool at one end, and receives the handle of the chuck key in a small cup shaped member at the other end, and another type being illustrated, for example, in Albertson Patent No. 2,257,559.

However, the former type presents the disadvantage, in use, that it swings too freely and tends to get in the workman's way or catch in the work, while the type illustrated in the Albertson patent has the very great disadvantage that it must be applied to the electric cable before the cable is applied to the tool, and, thus, it is not suitable for sale as a separate device which can be readily sold for use by the retail consumer.

It is an object of this invention to provide an improved chuck key holder which can be attached to the electric cable of a portable electric tool by any user of the tool, and which need not be applied at the factory, and which does not necessitate removal of the electric plug before the chuck key holder can be attached.

Another object of this invention is to provide a chuck key holder which is inexpensive to manufacture by virtue of its ready adaptability to being made by an extrusion process.

Another object of this invention is the provision of a chuck key holder which can be readily removed from the electric cable of a portable electric tool, if desired.

Another object is the provision of a chuck key holder simple in form, easy to use and cheap to manufacture.

Other objects and advantages of the invention will be apparent from the following description and the accompanying drawings, in which similar reference characters indicate similar parts throughout the several views.

Figure 1 is an elevational view of our invention shown in position of use with a portable electric tool.

Fgure 2 is an end view of one form of our invention and shows our improved chuck key holder holding a hex key.

Figure 3 is a vertical sectional view taken on the plane of the line 4—4 of Figure 2.

Figure 4 shows a modified form of our invention with a key for a geared chuck emplaced therein.

Figure 5 is an elevational view of a conventional chuck key for a geared chuck.

Figure 6 is a vertical sectional view taken on the plane of the line 6—6 of Figure 4.

The form of our invention shown in Figure 2 comprises a chuck key holder 10 having a uniform axial cross section, and made preferably of rubber or other flexible material by, for example, an extrusion process. The extrusion process is the most advantageous form of practicing our invention as it has the advantage of producing our improved chuck key holder at an extremely low unit cost. The chuck key holder 10 has two similar upper ears 11 defining a circular cavity 12 and an arcuate vertical slot 13. When the chuck key holder is to be applied to an electric cable 14, the cable 14 is pushed downward through arcuate slot 13 and seats in circular cavity 12. The bottom portion of the chuck key holder 10 has another opening 15 alternatively suitable in size for the reception of a hex key handle 16 or else of a geared chuck key handle. A slot 17 with more or less vertical arcuate sides facilitates the seating of the chuck key handle, which in use is pressed through slot 17 into circular seat 16. It has been found in practice that with this form of invention the key can be readily removed from its seat for use and then returned thereto.

In our modified chuck key holder 18 shown in Figure 4, the cable receiving end of the holder is the same as the cable receiving end of the chuck key holder shown in Figure 2. It has a pair of upstanding ears 11 defining a circular cavity 12 and arcuate slot 13, the electric cable being pressed through slot 13 and seating in cavity 12. The chuck key handle seat 19, however, in this modified form, does not communicate with the outside of the chuck key holder 18. Instead, seat 19 is in the form of a horizontal bore going completely through the horizontal axis of holder 18. In using modified chuck key holder 18 (or holder 10) for a geared chuck key, the handle 22, 23 of the key is preferably made so that it is centered on the gear supporting post 21, so that arms 22 and 23 of the chuck key are of approximately equal length. If it is desired to use the modified holder 18 (or holder 10) with a chuck key having handle arms of unequal length, this can be done by inserting one of the arms in the bore, but it has been found preferable in practice to center such asymmetrical handles by tapping them with a hammer before use. The chuck key handle 22 is inserted into bore 19, bore 19 usually being made somewhat undersize so that once inserted (usually with the use of a lubricant) the chuck key is not readily removable. In the use of modified chuck key holder 18 with a geared chuck key, the operator usually grasps the cable, chuck key holder 18, and chuck key 25 all in one hand, places the gear 27 in position on the chuck, rotates the chuck key 25 without removing it from the holder 18, and removes the chuck key when the chuck has been tightened or loosened as the case may be. A hex chuck key can be used in modified chuck key holder 18 in a similar manner.

Of course, the holder may, if desired, have an opening 15 or 19 of a size suitable to grasp post 21 of a geared chuck key instead of the handle 22, 23, and the shorter arm of the hex key can be inserted into opening 15 or 19 instead of the long arm as shown in Figures 1 through 3.

In use this chuck key holder has been found to be very convenient, easy to apply to an electric cable without removing the plug and cheap to manufacture.

We claim:

1. A holdler for a chuck key adapted to be carried on the conductor cable of a portable electric tool comprising, a relatively thick slab of flexible resilient material having an axially uniform cross section, said slab having a first opening therethrough of a diameter substantially equal to the diameter of the conductor cable of such a portable electric tool, said slab having a first pair of spaced ears defining said first opening and also defining a slot having an external arcuately inwardly converging mouth at the slab edge and internally merging into said opening, said first opening and slot being adapted to accommodate the passage of said conductor cable radial to said opening so that the slab may be grippingly mounted on said cable at a selected location by expanding the said ears along the said first opening and slot and inserting the cable in said opening, and a second opening spaced a substantial transverse distance from said first opening toward the opposite side of the slab, said second opening being of a diameter substantially equal to the cross sectional dimension of said chuck key handle so that said chuck key handle may be inserted and grippingly mounted in said second opening, said second opening being defined by a second pair of spaced ears, said second pair of ears also defining a second slot generally aligned with the first slot to extend outward of said second opening to the slab edge, said second slot being adapted to serve as a passthrough to said second opening for a chuck key handle.

2. A chuck key holder as recited in claim 1 in which the second opening of a smaller diametric dimension than the chuck key handle which it is adapted to grasp, so that the said chuck key handle must be forced into the said second opening.

References Cited in the file of this patent

UNITED STATES PATENTS

| | | |
|---|---|---|
| 2,015,404 | Kiddle | Sept. 24, 1935 |
| 2,257,559 | Albertson | Sept. 30, 1941 |
| 2,519,987 | Wernette | Aug. 22, 1950 |
| 2,591,477 | Tegarty | Apr. 1, 1952 |
| 2,632,930 | Donahue | Mar. 31, 1953 |
| 2,824,651 | Davis | Feb. 25, 1958 |

FOREIGN PATENTS

| | | |
|---|---|---|
| 688,260 | Great Britain | Mar. 4, 1953 |